United States Patent
Thum

[15] 3,670,187
[45] June 13, 1972

[54] IRONLESS DIRECT-CURRENT MACHINE HAVING A NORMAL CONDUCTING ROTOR AND A SUPERCONDUCTING EXCITATION SYSTEM

[72] Inventor: Egon Thum, Nurnberg, Germany

[73] Assignee: Siemens Aktiengesellschaft, Berlin and Munich, Germany

[22] Filed: June 4, 1971

[21] Appl. No.: 149,941

[30] Foreign Application Priority Data

June 5, 1970 Germany........................P 20 27 673.7

[52] U.S. Cl.................................................310/10, 310/186
[51] Int. Cl. .......................................................H02k 23/22
[58] Field of Search..........................310/10, 40, 52, 54, 186

[56] References Cited

UNITED STATES PATENTS

| | | |
|---|---|---|
| 3,289,019 | 11/1966 | Buchhold..................................310/52 |
| 3,368,087 | 2/1968 | Madsen....................................310/10 |
| 3,441,755 | 4/1969 | Grunwald.................................310/10 |

*Primary Examiner*—D. X. Sliney
*Attorney*—Curt M. Avery, et al.

[57] ABSTRACT

An ironless direct-current machine with a rotor having a rotor winding of normal conductivity and being equipped with a superconducting excitation system is provided with compensation coils electrically coupled with the rotor and traversed by the rotor current. The superconducting excitation system has super-conducting heteropolar excitation coils disposed between the compensation coils and the rotor winding. The compensation coils are dimensioned, arranged in proximity to the excitation coils and have ampere-turns such that the sum of the torque forces arising from the coaction of the field of the compensation coils with the current flowing through the excitation coils substantially cancels the torque forces arising from the coaction of the rotor winding field with the current flowing through the excitation coils.

2 Claims, 3 Drawing Figures

IRONLESS DIRECT-CURRENT MACHINE HAVING A NORMAL CONDUCTING ROTOR AND A SUPERCONDUCTING EXCITATION SYSTEM

My invention relates to direct current machines made without iron and having a normal conducting rotor and a super-conducting excitation system. More particularly, my invention relates to an ironless direct-current machine wherein compensation coils are dimensioned, arranged in proximity to the excitation coils and having ampere-turns such that the pole system of the machine is relieved of reaction forces.

From a paper by Appleton appearing in Cryogenics, June 1969, page 147, and entitled: "Motors, Generators and Flux Pumps," it is known to supply unipolar machines with superconductive, cooled excitation coils and to drive the normally conductive rotor at room temperature or a very low temperature that is above that required for superconductors. This, however, is very uneconomical since the power requirements of the cold machine for directing away the small rotor losses is unreasonably high. A cryogenic colling machine is needed for the superconductivity of the windings.

A significant consideration in evaluating the energy supply requirements of superconducting coils should be given to the mechanical repelling forces acting on these coils since the supporting members for these coils conduct heat from the surrounding parts which are at normal temperature into the deep cooled portions. According to the laws of thermodynamics, this heat must, however, be transported back to the region of normal temperature with a correspondingly large expenditure of energy.

With a single pole machine, the reaction force for useful power does not act on the pole system, instead, it acts on the current supply lines of the rotor so that the excitation coils, which are deep-cooled with expensive means, are free of such forces and the corresponding expensive supporting members can be dispensed with which serve to direct away the heat in the above mentioned undesired manner.

With machines equipped with superconductive excitation systems the application of iron for the attainable induction affords practically no advantage since the iron becomes magnetized far above the saturation induction because of the high excitation ampere-turns. In contrast, with these high inductions, high iron losses and high additional losses in the inductor windings arise and, accordingly, machines with superconductive excitation systems are preferably constructed without iron.

With heteropolar direct current machines of the conventional type, the reaction torques occur mostly on the pole cores and only slightly on the excitation coils or the compensation coils normally accommodated in slots.

An ironless direct-current machine with heteropolar superconductive excitation system and with a rotor driven at normal temperature would exhibit only a small armature reaction with inductions of the magnitude of several Tesla as well as with the usual current load of the rotor and without compensating coils. The mentioned reaction forces work would nonetheless operate fully on the excitation coils, which, because of the heat conduction through the supporting members, would make the total efficiency of such a machine so poor that the machine would be practically unusable.

An arrangement for compensating coils in proximity to the rotor winding, as is customary with normal iron-containing direct-current machines, would result in a current loading of the same magnitude as the rotor current loading but of opposite direction, and thus, the reaction torque is attracted to the compensating coils, thereby relieving the load on the pole system. In an ironless machine, however, this would lead to a considerable reduction of the magnetic flux passing through the rotor winding, since the spacing of the rotor winding of the pole system must be made greater by the thickness of the compensation coil, and with a heteropolar machine, the magnetic induction decreases rapidly in air with increasing distance from the excitation coils.

It is an object of my invention to provide an ironless direct-current machine having a superconductive excitation system and a normal conducting rotor that has a good operating efficiency comparable to the conventional machines of this type whose pole system is relieved of reaction forces and which has a correspondingly high induction.

According to a feature of the invention, the machine is provided with compensation coils electrically coupled with the rotor and traversed by the rotor current. The machine includes superconducting heteropolar excitation coils disposed between the compensation coils and the rotor winding. The compensation coils are dimensioned, arranged in proximity to the excitation coils, and have ampere-turns such that the sum of the torque forces arising from the coaction of the field of the compensation coils with the current flowing through the excitation coils substantially cancels the torque forces arising from the coaction of the rotor winding field with the current flowing through the excitation coils.

The already large forces operating on the excitation coils when the latter conduct current are only slightly increased by the current conduction of the rotor coils and the compensation coils, these forces forming no torque and no resulting force on the total pole system. The coils then also have torques on the individual pole coils with a proper configuration of the compensation windings, however, with no resulting torque on the entire pole system. These forces and individual torques within the excitation system can be taken up within the deep-cooled excitation system by means of mechanical supports, so that a heat flow from the warmer surroundings into the deep-cooled excitation system cannot occur.

The invention will now be described with reference to the drawings, wherein.

Figure 1:
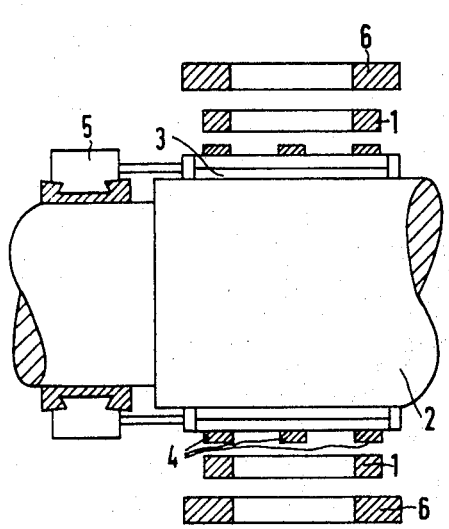
FIG. 1 illustrates a machine according to the invention in longitudinal section.
Figure 2:
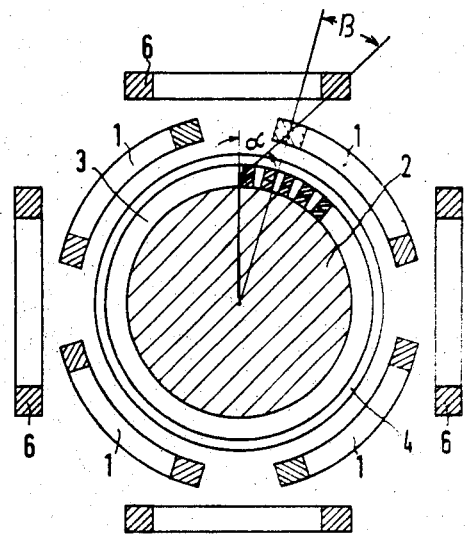
FIG. 2 illustrates the machine of FIG. 1 in cross-section.

FIGS. 1 and 2 show a four pole direct-current machine having excitation coils 1 arranged as in a normal direct-current machine along an imaginary cylindrical surface. The ironless rotor includes a shaft 2 made of nonconductive material to prevent eddy current losses. The rotor winding 3 is of conventional form and is held to the shaft by means of bands 4. The individual coil portions are arranged around the periphery of the shaft and spaced from each other in order to, first, direct away the current heating losses by means of a cooling medium such as air and, second, to connect to bend the end face connections in the usual manner and connect them to the commutator 5. Apart from the omitted rotor iron, the construction and operation of the rotor correspond essentially to that of a normal direct-current machine rotor.

In order to achieve a zone as free as possible from the excitation field for current commutation, it is advantageous to select the angle $\alpha$ between the plane through the middle of the commutation zone and the middle of the side of the excitation coil and the plane through the middle of the commutation zone and the shaft axis at 45°, see FIG. 2.

Outermost of the excitation coils 1 are located the compensation coils 6 which are traversed by the rotor current. The position of the compensation coils and the magnitude of their ampere-turns is so selected that the torque forces produced by the current in the rotor winding 3 and the excitation ampere turns of the excitation coil 1 are cancelled. The reaction torque then acts fully on the compensation coils disposed outside of the cooled region. The compensation winding can advantageously be so dimensioned that they develop a field supporting the current commutation in the commutating coils of the rotor winding 3 and, in this way, undertake the function of the commutating poles of a normal direct-current machine. For this purpose, the compensation coil sides must lie within respective spatial angles defined by the plane through the commutation zone center and the corresponding excitation coil side and the plane taken through the shaft axis and the same side of the excitation coil (angle $\beta$ in FIG. 2).

Figure 3:
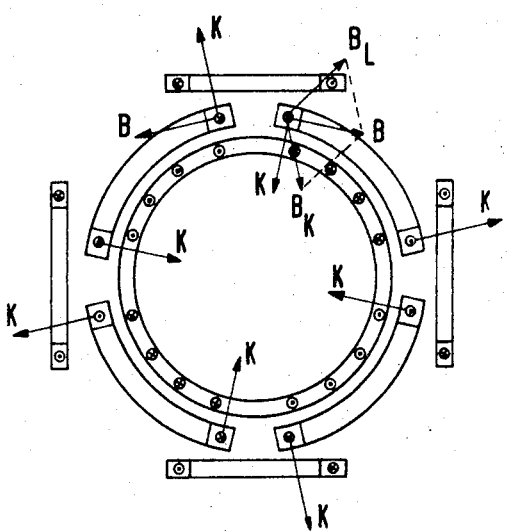
FIG. 3 illustrates a cross-section according to FIG. 2 showing the vector of the forces acting on the excitation coils and diagrams of the inductions or magnetic field vectors.

FIG. 3 shows such a machine wherein a magnetic induction $B$ is at the location of the superconducting excitation coil. The induction $B$ is equal to the vector sum of the induction of the rotor field $B_L$ and the compensation field $B_K$. The resultant induction $B = B_L + B_K$ must be tangential to the imaginary cylinder surface passing through the middle of the excitation coil so that the forces are directed in a radial direction and so form no torque.

While the invention has been described by means of a specific example and in a specivid embodiment, I do not wish to become limited thereto for obvious modifications will occur to those skilled in the art without departing from the spirit and scope of the invention.

I claim:

1. Ironless direct-current machine with a rotor having a rotor winding of normal conductivity and being equipped with a superconducting excitation system, comprising compensation coils electrically coupled with the rotor and traversed by the rotor current, said system having superconducting heteropolar excitation coils disposed between said compensation coils and said rotor winding; said compensation coils being dimensioned, arranged in proximity to said excitation coils and having ampere-turns such that the sum of the torque forces arising from the coaction of the field of said compensation coils with the current flowing through said excitation coils substantially cancels the torque forces arising from the coaction of the rotor-winding field with the current flowing through said excitation coils.

2. A direct-current machine according to claim 1 comprising a commutator arranged on said rotor and connected to said rotor winding; each of said excitation coils having two sides extending in the longitudinal direction of said rotor; said rotor and rotor winding and said excitation coil jointly defining a first plane passing through the center of the corresponding commutation zone of said rotor winding and a corresponding side of said excitation coil, and defining a second plane passing through the axis of said rotor and said side of said excitation winding; said first and second planes defining an angle; a plurality of said angles being defined by respective pluralities of said first and second planes; each of said compensation coils having two sides extending in said longitudinal direction, each of said sides of said compensation coils being disposed in the angular space of a corresponding one of said angles.

* * * * *